United States Patent
Hara

(10) Patent No.: US 7,825,177 B2
(45) Date of Patent: Nov. 2, 2010

(54) ADDITION CURE SILICONE RUBBER ADHESIVE COMPOSITION AND MAKING METHOD

(75) Inventor: Hiroyasu Hara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 311 days.

(21) Appl. No.: 12/003,366

(22) Filed: Dec. 21, 2007

(65) Prior Publication Data

US 2008/0153956 A1 Jun. 26, 2008

(30) Foreign Application Priority Data

Dec. 26, 2006 (JP) .............. 2006-348970

(51) Int. Cl.
C08K 5/541 (2006.01)
C08K 3/10 (2006.01)

(52) U.S. Cl. .............. 524/261; 524/403; 524/730; 523/351

(58) Field of Classification Search .............. 524/730, 524/261, 403; 523/351
See application file for complete search history.

(56) References Cited

U.S. PATENT DOCUMENTS

| 4,077,899 A | 3/1978 | van Gils et al. |
| 4,138,275 A | 2/1979 | Yokota et al. |
| 5,166,293 A * | 11/1992 | Okinoshima et al. .......... 528/15 |
| 5,399,650 A * | 3/1995 | Bilgrien ....................... 528/15 |
| 5,981,682 A | 11/1999 | Onishi |
| 6,811,650 B2 | 11/2004 | Takuman et al. |

FOREIGN PATENT DOCUMENTS

| DE | 4117471 A1 | 12/1991 |
| EP | 0639605 A2 | 2/1995 |
| JP | 52-147963 | 12/1977 |
| JP | 53-21026 | 6/1978 |
| JP | 10-008022 A | 1/1998 |
| JP | 2002-285130 A | 10/2002 |
| JP | 2005-060549 A | 3/2005 |
| JP | 2005-290312 A | 10/2005 |
| JP | 2006-335899 A | 12/2006 |

* cited by examiner

*Primary Examiner*—Kriellion A Sanders
(74) *Attorney, Agent, or Firm*—Birch, Stewart, Kolasch & Birch, LLP

(57) ABSTRACT

An addition cure silicone rubber adhesive composition comprising (A) an organopolysiloxane, (B) an inorganic filler, (C) an alkoxysilane, (D) a hydrolytic catalyst selected from titanium, zirconium and aluminum compounds, (E) an organohydrogenpolysiloxane, (F) a cure regulator, and (G) a platinum compound is prepared by mixing components (A), (B), (C) and (D), in the absence of component (G), at 0-200° C. and a reduced pressure to form a premix, and thereafter, adding component (G) and the remaining components to the premix and mixing at 0-60° C. and a reduced pressure.

11 Claims, No Drawings

ADDITION CURE SILICONE RUBBER ADHESIVE COMPOSITION AND MAKING METHOD

CROSS-REFERENCE TO RELATED APPLICATION

This non-provisional application claims priority under 35 U.S.C. §119(a) on Patent Application No. 2006-348970 filed in Japan on Dec. 26, 2006, the entire contents of which are hereby incorporated by reference.

TECHNICAL FIELD

This invention relates to an addition cure silicone rubber adhesive composition which is fully adherent to various substrates of resins, metals and the like, and a method for preparing the same.

BACKGROUND ART

In pursuit of addition cure silicone adhesives which are adherent to various substrates, one traditional approach is to add tackifiers to curable silicone resins so as to develop adhesive nature. For example, JP-B 53-21026 corresponding to U.S. Pat. No. 3,699,072 discloses an addition cure silicone rubber composition comprising an alkoxysilyl-containing hydrogensiloxane, and JP-B 53-13508 corresponding to U.S. Pat. No. 4,077,934 discloses an addition cure silicone rubber composition comprising an epoxy-containing hydrogensiloxane.

Owing to these development efforts, addition cure silicone adhesives which are adherent to various substrates have been marketed. These silicone adhesives, however, are difficult to adhere to some substrates, especially certain resins. Adhesion may not be developed unless primers are used. Those resins which are substantially non-receptive to the relevant adhesives, referred to as "less-receptive resins," hereinafter, include polycarbonates and polyphenylene sulfides. There is an increasing need for addition cure silicone adhesives which are spontaneously adherent even to the less-receptive resins.

Known technologies for providing addition cure silicone adhesives which are spontaneously adherent to the less-receptive resins include the addition of nitrogen compounds (JP-B 52-008854 corresponding to U.S. Pat. No. 3,837,876) and the combined use of an alkoxysilane as the tackifier and an organotin, organotitanium, organoaluminum or zirconium compound as the hydrolytic catalyst for the alkoxysilane. However, these technologies can affect the curability of addition cure silicone adhesives. When nitrogen compounds are added to the addition cure silicone adhesives, the catalytic capability of platinum atoms serving as the addition reaction catalyst is substantially prohibited so that the cure process becomes extremely inconsistent. When organotin, organotitanium, organoaluminum or zirconium compounds are similarly added, they deactivate the organohydrogenpolysiloxane in the addition cure silicone adhesives. At elevated temperature, these compounds help cleavage of siloxane bonds in the silicone polymer, causing the cured product to lose heat resistance.

DISCLOSURE OF THE INVENTION

An object of the invention is to provide an addition cure silicone rubber adhesive composition which is consistently curable despite the presence of a hydrolytic catalyst, thermally stable in the cured state, and fully adherent to less-receptive resins.

The inventor has found that an addition cure silicone rubber adhesive composition comprising components (A) to (G), defined below, exhibits satisfactory adhesion to less-receptive resins, is shelf stable, and remains thermally stable in the cured state, when it is prepared through specific successive steps.

In a first aspect, the invention provides an addition cure silicone rubber adhesive composition comprising components (A) to (G), defined below, the composition being prepared by mixing components (A) and (B) and part or all of components (C) and (D), in the absence of component (G), at a temperature of 0° C. to 200° C. and an atmospheric to reduced pressure to form a premix, and adding component (G) and the remaining components to the premix and mixing at a temperature of 0° C. to 60° C. and an atmospheric to reduced pressure. The adhesive composition is typically of one-pack type.

In a second aspect, the invention provides a method for preparing an addition cure silicone rubber adhesive composition comprising components (A) to (G), defined below, the method comprising the first step of mixing components (A), (B), (C) and (D), in the absence of component (G), in an environment at 0° C. to 200° C. and an atmospheric to reduced pressure to form a premix, and the second step of adding component (G) and the remaining components to the premix and mixing in an environment at 0° C. to 60° C. and an atmospheric to reduced pressure. Preferably, component (C) and/or (D) is added in divided portions during the first and second steps. The resulting adhesive composition is typically of one-pack type.

The components are:

(A) 100 parts by weight of an organopolysiloxane containing at least two silicon-bonded alkenyl groups in a molecule, represented by the average compositional formula:

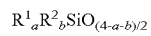

$$R^1_a R^2_b SiO_{(4-a-b)/2}$$

wherein $R^1$ is a substituted or unsubstituted, monovalent hydrocarbon group free of aliphatic saturation, $R^2$ is an alkenyl group, "a" is a positive number of 0.96 to 2.00, "b" is a positive number of 0.001 to 0.5, and the sum of a+b is 1.46 to 2.1, (B) 0.5 to 400 parts by weight of an inorganic filler, (C) 0.1 to 20 parts by weight of an alkoxysilane, (D) 0.001 to 10 parts by weight of a hydrolytic catalyst selected from the group consisting of titanium compounds, zirconium compounds and aluminum compounds, (E) an organohydrogenpolysiloxane represented by the average compositional formula:

$$R^3_c H_d SiO_{(4-c-d)/2}$$

wherein $R^3$ is a substituted or unsubstituted, monovalent hydrocarbon group free of aliphatic saturation, "c" is a positive number of 0.7 to 2.1, "d" is a positive number of 0.005 to 1.2, and the sum of c+d is 0.8 to 3.0, in such an amount as to provide a ratio of hydrosilyl groups to alkenyl groups available in the composition in the range from 0.4:1.0 to 10.0:1.0, (F) a necessary amount of a cure regulator, and (G) a platinum group metal compound in an amount to give a metal element content of 1 to 2000 ppm based on the total weight of the composition.

BENEFITS OF THE INVENTION

The addition cure silicone rubber adhesive composition of the invention maintains consistent cure and thermal stability in the cured state and exhibits satisfactory adhesion to less-receptive resins. It is thus useful as the adhesive to be applied around electric and electronic parts and automobile mounted parts.

DESCRIPTION OF THE PREFERRED EMBODIMENT

The invention provides an addition cure silicone rubber adhesive composition comprising components (A) to (G). The composition is prepared through the step (1) of mixing components (A) and (B) and part or all of components (C) and (D), in the absence of component (G), in an environment at 0° C. to 200° C. and an atmospheric to reduced pressure to form a premix, and the step (2) of adding component (G) and the remaining components to the premix and mixing in an environment at 0° C. to 60° C. and an atmospheric to reduced pressure.

Components (A) to (G) are:

(A) an organopolysiloxane containing at least two silicon-bonded alkenyl groups in a molecule, represented by the average compositional formula:

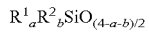

wherein $R^1$ is a substituted or unsubstituted, monovalent hydrocarbon group free of aliphatic saturation, $R^2$ is an alkenyl group, "a" is a positive number of 0.96 to 2.00, "b" is a positive number of 0.001 to 0.5, and the sum of a+b is 1.46 to 2.1, (B) an inorganic filler, (C) an alkoxysilane, (D) a hydrolytic catalyst selected from the group consisting of titanium compounds, zirconium compounds and aluminum compounds, (E) an organohydrogenpolysiloxane represented by the average compositional formula:

wherein $R^3$ is a substituted or unsubstituted, monovalent hydrocarbon group free of aliphatic saturation, "c" is a positive number of 0.7 to 2.1, "d" is a positive number of 0.005 to 1.2, and the sum of c+d is 0.8 to 3.0, (F) a cure regulator, and (G) a platinum group metal compound.

Below these components are described in detail.

Component (A) is an organopolysiloxane represented by the average compositional formula:

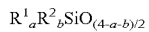

wherein $R_1$ is a substituted or unsubstituted, monovalent hydrocarbon group free of aliphatic saturation, $R^2$ is an alkenyl group, "a" is a positive number of 0.96 to 2.00, "b" is a positive number of 0.001 to 0.5, and the sum of a+b is 1.46 to 2.1, and preferably "a" is 1.85 to 2.00, "b" is 0.001 to 0.02, and a+b is 1.95 to 2.04. It contains at least 2, preferably 2 to 40, and more preferably 2 to 20 silicon-bonded alkenyl groups per molecule. Its molecular structure is not particularly limited and it may be linear, branched, cyclic or network. Also it may be a polymer consisting of common siloxane units or a copolymer of two or more different siloxane units.

Examples of substituted or unsubstituted, monovalent hydrocarbon groups represented by $R^1$ include alkyl groups such as methyl, ethyl, propyl, isopropyl, butyl, hexyl, octyl, and dodecyl, cycloalkyl groups such as cyclopentyl, cyclohexyl and cycloheptyl, aryl groups such as phenyl, tolyl, xylyl, and naphthyl, aralkyl groups such as benzyl, phenylethyl, and phenylpropyl, and substituted hydrocarbon groups in which some or all hydrogen atoms are substituted by fluorine atoms, chlorine atoms, nitrile groups or the like, such as trifluoropropyl, chloromethyl, and cyanoethyl. $R^1$ may be the same or different although it is preferred for chemical stability and ease of synthesis that all $R^1$ be methyl. Some methyl groups may be replaced by phenyl or trifluoropropyl groups if necessary for a particular application.

Examples of alkenyl groups represented by $R^2$ include vinyl, allyl, isopropenyl, butenyl, and pentenyl. Preferably $R^2$ is vinyl or allyl, with the vinyl being most preferred for chemical stability and ease of synthesis. The alkenyl groups may be attached to the silicon atoms at the ends of the molecular chain or silicon atoms midway the molecular chain (i.e., non-terminal positions of the molecular chain) or both.

Most often, the organopolysiloxane (A) is a linear diorganopolysiloxane whose backbone consists essentially of recurring diorganosiloxane units (e.g., $R^1_2SiO$, $R^2_2SiO$ and $R^1R^2SiO$ units) and whose molecular chain is blocked with triorganosiloxy groups (e.g., $R^1_3SiO_{1/2}$, $R^2_3SiO_{1/2}$, $R^1R^2_2SiO_{1/2}$ and $R^1_2R^2SiO_{1/2}$) at both ends. It may also be a partially branched structure or a three-dimensional network structure further containing trifunctional siloxane units and/or $SiO_2$ units.

The organopolysiloxane (A) should preferably have a viscosity of at least 10 mPa-s at 25° C., more preferably 50 to 500,000 mPa-s at 25° C. If the viscosity is less than 10 mPa-s, the cured composition may become brittle and cannot conform to any deformation of the substrate. If the viscosity is more than 500,000 mPa-s, the uncured composition may become highly viscous and inefficient to work. Two or more organopolysiloxanes may be used in combination as long as the combination has a viscosity within the range. The viscosity as used herein is measured by a rotational viscometer at 25° C.

Component (B) is an inorganic filler which is added for the purpose of improving the flow of the silicone rubber composition or the rubber strength or adhesion of the cured composition. The inorganic filler is preferably selected from among reinforcing silica, crystalline silica (ground quartz), diatomaceous earth, calcium carbonate, and mixtures thereof.

The reinforcing silica generally has a specific surface area of about 40 to 500 m²/g, and preferably about 100 to 400 m²/g, as measured by the BET method. The crystalline silica (ground quartz) generally has an average particle size of about 0.1 to 100 µm, and preferably about 1 to 50 µm. The calcium carbonate generally has a specific surface area of about 0.01 to 50 m²/g, and preferably about 0.1 to 50 m²/g, as measured by the BET method.

The inorganic filler is normally hydrophilic in the surface untreated state and may be used as such. Prior to use, the filler may be treated with a surface treating agent for hydrophobization. Alternatively, a surface treating agent is added during compounding of the inorganic filler with the organopolysiloxane (A), whereby the filler is rendered hydrophobic. The surface treating agent is selected from known surface treating agents including alkylalkoxysilanes, alkylchlorosilanes, alkylsilazanes, silane coupling agents, titanate treating agents, fatty acid esters, and mixtures thereof.

Specifically, examples of the reinforcing silica include fumed silica (dry silica), precipitated silica (wet silica), fired silica and the like, depending on the preparation method. Whether or not they are surface treated, there are hydrophilic and hydrophobic silicas. Examples of hydrophilic silica include Aerosil® 130, 200 and 300 (Nippon Aerosil Co., Ltd. and Degussa), Cabosil® MS-5 and MS-7 (Cabot Corp.), Reorosil® QS-102 and QS-103 (Tokuyama Corp.), and Nipsil® LP (Nippon Silica Co., Ltd.). Examples of hydrophobic silica include Aerosil® R-812, R-812S, R-972 and R-974 (Degussa), Reorosil® MT-10 (Tokuyama Corp.), and Nipsil® SS (Nippon Silica Industry Co., Ltd.). Examples of crystalline silica include Crystallite® (Tatsumori Co., Ltd.), Minusil® (US Silica), and Imsil® (Illinois Mineral).

Among others, dry silica, wet silica and crystalline silica are preferred from the standpoint of silicone rubber strength. Alternatively, non-reinforcing fillers such as diatomaceous earth and calcium carbonate may be used as the inorganic filler.

An appropriate amount of the inorganic filler compounded is 0.5 to 400 parts, and preferably 1 to 200 parts by weight per 100 parts by weight of component (A). Too less an amount of the inorganic filler results in cured rubber with insufficient strength. With too much an amount of the inorganic filler, the uncured composition has a drastically increased viscosity and is inefficient to work and the cured composition becomes too hard and brittle.

Component (C) is an alkoxysilane which is added for the purpose of blocking moisture and hydroxyl groups in components (A) and (B). The alkoxysilanes include tetrafunctional alkoxysilanes, mono-, di- and tri-functional organoalkoxysilanes, and partial hydrolytic condensates thereof. Inter alia, tetrafunctional and trifunctional (organo)alkoxysilanes and partial hydrolytic condensates thereof are preferred. Examples include tetraalkoxysilanes having $C_1$-$C_4$ alkoxy groups such as $Si(OCH_3)_4$, $Si(OC_2H_5)_4$, $Si(OC_3H_7)_4$ and $Si(OC_4H_9)_4$; organotrialkoxysilanes such as R—Si$(OR^1)_3$ wherein $R^1$ is a $C_1$-$C_4$ alkyl group, and R is an alkyl group such as methyl, ethyl, propyl or butyl, an alkenyl group such as vinyl, allyl, propenyl, isopropenyl or butenyl, phenyl, 3,3,3-trifluoropropyl, γ-glycidoxypropyl, β-(3,4-epoxy)cyclohexylethyl, or γ-(meth)acryloxypropyl; α-silyl esters of the formula:

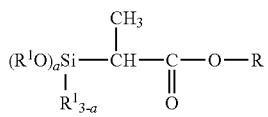

wherein $R^1$ and R are as defined above, and "a" is 1, 2 or 3; and partial hydrolytic condensates thereof.

An appropriate amount of component (C) compounded is 0.1 to 20 parts, and preferably 0.5 to 10 parts by weight per 100 parts by weight of component (A). Too less an amount of component (C) is insufficiently effective for blocking moisture and hydroxyl groups in components (A) and (B) whereas too much an amount can detract from the physical properties of the cured silicone rubber.

Component (D) is a hydrolytic catalyst which exerts a catalytic function for enhancing the effect of alkoxysilane (C) of silylating hydroxyl groups in components (A) and (B). The hydrolytic catalyst is selected from among organotitanium compounds, organozirconium compounds, and organoaluminum compounds. The structure may be a combination of metal element with a substituent such as an alkoxide, acetylacetone or fatty acid, a combination of metal element with a ligand (for example, alcolate, fatty acid ester or complex of each metal). The substituted form may be a single one or a mixture of substituted forms. Examples of the compounds are given by the following compositional formulae.

$Ti(OC_3H_7)_4$, $Ti(OC_4H_9)_4$, $Ti(OC_8H_{17})_4$, $Ti(OC_3H_7)_2$(ACAC)$_2$, $Ti(ACAC)_4$, $Zr(OC_2H_5)_4$, $Zr(OC_3H_7)_4$, $Zr(OC_4H_9)_4$, $Zr(OC_8H_{17})_4$, $Zr(OC_3H_7)_2(ACAC)_2$, $Zr(ACAC)_4$, $Zr(OC_3H_7)_3(C_3COCH_2COC_{12}H_{25})$, $Zr(OC_3H_7)_3$(OCOCH$_3$), $Zr(OC_3H_7)_3(OCOC_{12}H_{25})$, $Al(OC_3H_7)_3$, $Al(OC_3H_7)_2(C_3COCH_2COC_{12}H_{25})$, $Al(OC_3H_7)_2$(OCOCH$_3$), $Al(OC_3H_7)_2(OCOC_{12}H_{25})$.

Note that ACAC is acetylacetone.

The hydrolytic catalyst (D) is added in an amount necessary and sufficient to achieve an adhesion promoting effect, specifically 0.001 to 10 parts, and preferably 0.01 to 5 parts by weight per 100 parts by weight of component (A). Too less an amount of component (D) is insufficiently effective for blocking moisture and hydroxyl groups in components (A) and (B) whereas too much an amount can promote formation of a cured gel of component (C).

Component (E) is an organohydrogenpolysiloxane which serves as a crosslinker by reacting with component (A) in the presence of the platinum base catalyst (G) to be described later. Its molecular structure is not particularly limited, and any of currently available structures including linear, cyclic, branched and three-dimensional network (resinous) structures may be used. The organohydrogenpolysiloxane should have at least two, preferably at least three silicon-bonded hydrogen atoms (i.e., hydrosilyl groups represented by SiH) per molecule. The number of SiH groups per molecule is generally about 2 to 300, preferably about 3 to 200, and more preferably about 4 to 150.

The organohydrogenpolysiloxane has the following average compositional formula.

$$R^3{}_c H_d SiO_{(4-c-d)/2}$$

Herein $R^3$ is a substituted or unsubstituted, monovalent hydrocarbon group free of aliphatic saturation, which is attached to the silicon atom and preferably has 1 to 10 carbon atoms. Examples of the monovalent hydrocarbon group represented by $R^3$ include alkyl groups such as methyl, ethyl, propyl, isopropyl, butyl, isobutyl, tert-butyl, pentyl, neopentyl, hexyl, cyclohexyl, octyl, nonyl, and decyl, aryl groups such as phenyl, tolyl, xylyl, and naphthyl, aralkyl groups such as benzyl, phenylethyl, and phenylpropyl, and substituted hydrocarbon groups in which some or all hydrogen atoms are substituted by halogen atoms such as fluorine, bromine, and chlorine such as chloromethyl, chloropropyl, bromoethyl, and trifluoropropyl. Preferred substituted or unsubstituted, monovalent hydrocarbon groups represented by $R^3$ are alkyl and aryl groups, with methyl and phenyl being more preferred. The subscript "c" is a positive number of 0.7 to 2.1, "d" is a positive number of 0.005 to 1.2, and the sum of c+d is 0.8 to 3.0. Preferably c is 0.9 to 2.0, d is 0.02 to 1.2, and c+d is 1.0 to 2.5; more preferably c is 1.0 to 1.8, d is 0.4 to 1.0, and c+d is 1.5 to 2.3; and most preferably c is 1.0 to 1.73, d is 0.47 to 1.0, and c+d is 1.9 to 2.2.

The SiH groups which are included in a number per molecule of at least 2 (generally 2 to 300), preferably at least 3 (e.g., about 3 to 200), and more preferably about 4 to 150 may be located at ends or intermediate positions of the molecular chain or both. The organohydrogenpolysiloxane may have any of linear, cyclic, branched and three-dimensional network structures. The number of silicon atoms per molecule (or degree of polymerization) is generally about 2 to 300, preferably about 3 to 200, and more preferably about 4 to 150. It is preferred to use an organohydrogenpolysiloxane having a viscosity at 25° C. of about 0.1 to 2,000 mPa-s, and preferably about 0.5 to 500 mPa-s, which is liquid at room temperature (25° C.).

Examples of the organohydrogenpolysiloxane (E) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, trimethylsiloxy end-capped methylhydrogenpolysiloxane, trimethylsiloxy end-capped dimethylsiloxane-methylhydrogensiloxane copolymers, dimethylhydrogensiloxy end-capped dimethylpolysiloxane, dimethylhydrogensiloxy end-capped dimethylsiloxane-methylhydrogensiloxane copolymers, trimethylsiloxy end-capped methylhydrogensiloxane-diphenylsiloxane copolymers, trimethylsiloxy end-capped methylhydrogensiloxane-diphenylsiloxane-dimethylsiloxane copolymers, trimethylsiloxy end-capped methylhydrogensiloxane-methylphenylsiloxane-dimethylsiloxane copolymers, dimethylhydrogensiloxy end-capped methylhydrogensiloxane-dimethylsiloxane-diphenylsiloxane copolymers, dimethylhydrogensiloxy end-capped methylhydrogensiloxane-dimethylsiloxane-methylphenylsiloxane copolymers, copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units and $(C_6H_5)_3SiO_{1/2}$ units, and substituted forms of the foregoing in which some or all methyl groups are substituted by other alkyl groups (e.g., ethyl or propyl) or aryl groups (e.g., phenyl). The foregoing organohydrogenpolysiloxanes may be used alone or in admixture.

Component (E) is compounded in such an amount as to provide 0.4 to 10 silicon-bonded hydrogen atoms available from component (E) and other compounds per one of alkenyl groups available from component (A) including high-density hydrogenpolysiloxane. Preferably the number of hydrosilyl groups per alkenyl group is in a range of 1.2 to 5. If the number of hydrosilyl groups is less than 0.4, the composition is less curable, failing to form a cured product with the desired strength. If the number of hydrosilyl groups is more than 10, component (E) can cause the composition to expand upon curing and experience changes with time of its physical properties.

Component (F) is a cure regulator which serves to adjust the cure time of the composition so that the composition may be applied in practice. The cure regulator may be selected from well-known regulators including vinyl-containing organopolysiloxanes such as vinylcyclotetrasiloxane, triallyl isocyanurate, alkyl maleates, acetylene alcohols and silane or siloxane-modified products thereof, hydroperoxide, tetramethylethylenediamine, benzotriazole, and mixtures thereof.

The amount of component (F) compounded may be a necessary amount, generally 0.01 to 10 parts, and preferably 0.1 to 2 parts by weight per 100 parts by weight of component (A). Too less an amount of component (F) may fail to ensure a pot life whereas too much an amount may adversely affect the cure, requiring a more than necessity time until the completion of cure.

Component (G) is a platinum group metal compound which is used as a catalyst for promoting the addition cure reaction (or hydrosilylation) between aliphatic unsaturated group-containing organopolysiloxane and organohydrogensiloxane. It may be any of well-known compounds. Examples include platinum black, chloroplatinic acid, alcohol-modified chloroplatinic acid, and complexes of chloroplatinic acid with olefins, aldehydes, vinylsiloxanes or acetylene alcohols, as well as rhodium compounds.

In view of the intended application of the inventive composition where inclusion of corrosive components should be avoided, the platinum base catalyst should also preferably be free of chloride ions. Accordingly, the preferred platinum base catalyst is a zero-valent platinum complex having a chloride ion content of 5 ppm or less. Examples include the vinylsiloxane/platinum complexes described in U.S. Pat. No. 3,715,334, U.S. Pat. No. 3,775,452, and U.S. Pat. No. 3,814,730.

The platinum group metal compound is added in a catalytic amount, which may be determined appropriate depending on the desired cure rate. Typically the amount is to give 1 to 2,000 ppm, and preferably 1 to 200 ppm of platinum metal based on the total weight of the composition.

The addition cure silicone rubber adhesive composition of the invention is prepared through the step (1) of mixing components (A) and (B) and part or all of components (C) and (D), in the absence of component (G), in an environment at 0° C. to 200° C. and an atmospheric to reduced pressure to form a premix; and the step (2) of adding component (G) and the remaining components to the premix and mixing in an environment at 0° C. to 60° C. and an atmospheric to reduced pressure. Then the composition is of one-pack type.

The method for preparing the addition cure silicone rubber adhesive composition of the invention includes the first step of mixing components (A) and (B) and part or all of components (C) and (D) as essential components, but in the absence of component (G), to form a premix. The first step purports that component (C) blocks or scavenges water and hydroxyl groups (silanol, etc.) in components (A) and (B).

In general, if a one-pack type addition cure composition contains a hydrolytic catalyst (typically titanium, zirconium or aluminum compound) which is effective for adhesion, then the material is acceleratedly altered by moisture and hydroxyl groups available in the system. First, the alkoxysilane added as the tackifier is hydrolyzed, losing the tackifying activity. Secondly, the organohydrogenpolysiloxane added as the crosslinker is deactivated. Then, the moisture and hydroxyl groups available in the system must be scavenged or blocked in order to ensure that the one-pack type addition cure composition is shelf stable.

By mixing the feed stocks, siloxane and inorganic filler at elevated temperature or under reduced pressure, the system may be depleted of moisture to some extent. This measure, however, fails to remove hydroxyl groups (silanol) in the siloxane structure and hydroxyl groups on the surface of the inorganic filler. The first step of the inventive method succeeds in blocking or scavenging moisture and hydroxyl groups in the system. Whether or not the method includes the first step, the one-pack type addition cure composition largely differs in shelf stability.

The essential components to be added in the first step are components (A) and (B) and part or all of components (C) and (D). Since components (C) and (D) added in the first step can be partially deactivated during the step, preferably they are added in divided portions during both the first and second steps for the purpose of improved tack-production. It is noted that the necessary amount of component (C) which is added in the first step for blocking moisture and hydroxyl groups in components (A) and (B) is, in some cases, smaller than the necessary amount of component (D) which is added in the second step for imparting adhesiveness.

The preferred amounts of the respective components added in the first step are:

component (A): all, component (B): all, component (C): 1-90 wt %, more preferably 10-50 wt % of its amount, and component (D): 0.1-90 wt %, more preferably 1-50 wt % of its amount.

Component (E) may be added either in the first step or in the second step (i.e., in the first and/or second step). Where hydroxyl groups in the structure are present in a large amount, it is preferred to add component (E) in the first step. Component (F) may also be added either in the first step or in the second step (i.e., in the first and/or second step). If there is the likelihood of component (F) volatilizing during the first step, it is preferred to add component (F) in the second step. Component (G) is added only in the second step, but not in the first step.

In the first step, the foregoing components are mixed in an environment at a temperature of 0° C. to 200° C., preferably 10° C. to 100° C. and an atmospheric to reduced pressure, preferably a reduced pressure of 0.1 to 20 kPa, preferably for 5 minutes to 6 hours, more preferably 15 minutes to 2 hours to form a premix. Outside the temperature range, component (C) will volatilize off at higher temperatures whereas a longer time is necessary at lower temperatures. If the mixing time is too short, blocking of moisture and hydroxyl groups in components (A) and (B) may be insufficient.

Exemplary mixing machines used in the first step include a planetary mixer, vacuum kneader, Shinagawa universal mixer, Butterfly mixer, Torero mixer and the like.

In the second step, the premix resulting from the first step is combined with component (G) and additionally with the remaining components, and they are mixed together, yielding an addition cure silicone rubber adhesive composition.

More specifically, in the second step, all of component (G) and the remaining components are compounded with the premix resulting from the first step and mixed together in an environment at a temperature of 0° C. to 60° C., preferably 10° C. to 60° C. and an atmospheric to reduced pressure, preferably a reduced pressure of 0.1 to 20 kPa, preferably for 5 minutes to 6 hours, more preferably 15 minutes to 2 hours. Outside the temperature range, inconvenient problems arise. At higher temperatures, cure reaction takes place during the mixing step whereas moisture in the environment will condense at lower temperatures. If the mixing time is too short, the composition may be less uniform. If the mixing time is too long, components (C) and (F) may volatilize off during the step.

In the second step, a mixing machine as used in the first step may be used.

To the composition, colorants including inorganic pigments such as titanium oxide and cobalt blue, and organic dyes, heat resistance and/or flame retardance modifiers such as cerium oxide, zinc carbonate, manganese carbonate, red iron oxide, titanium oxide, and carbon black may be added in an amount that does not compromise the object of the invention. Also, carbon black in powder, whisker or high-structure form, graphite or the like may be added to the composition for improving electric conduction stability. These optional components may be added either in the first step or in the second step. If a component contains a large amount of moisture or hydroxyl groups, that component should preferably be added in the first step.

The addition cure silicone rubber adhesive composition thus obtained is fully adherent to a variety of substrates including inorganic materials, resins, and metals and even to less-receptive resins. Examples of the substrate to which the adhesive composition is applicable include thermoplastic resins, for example, polyamide resins such as nylon 6 and nylon 66, polyphthalamide (PPA), polybutylene terephthalate (PBT), polyphenylene sulfide (PPS), and syndiotactic polystyrene (SPS).

As to the application method and curing conditions of the addition cure silicone rubber adhesive composition, the adhesive composition may be applied onto a substrate, such as by coating, to form an adhesive composition layer on the substrate. Alternatively, the adhesive composition is filled in between different substrates to form an adhesive composition layer therebetween. The adhesive composition layer is then cured at room temperature (25° C.) to 200° C., preferably room temperature to 150° C. for 1 minute to 7 days, preferably 1 minute to 3 hours.

EXAMPLE

Examples are given below by way of illustration and not by way of limitation. All parts are by weight (pbw). The abbreviation Vi stands for vinyl, Me for methyl, iPr for isopropyl, and ACAC for acetylacetone.

Examples 1 to 7 and Comparative Examples 1 and 2

Silicone rubber adhesive compositions were prepared according to the formulation shown in Table 1. In the first step, predetermined amounts of components (A) to (E) were compounded and mixed on a vacuum kneader at 60±10° C. and 1 kPa for 1 hour to form a premix. In the second step, predetermined amounts of components (C) to (G) were added to the premix and mixed on a vacuum kneader at 30±10° C. and 1 kPa for 1 hour.

The compositions were measured for viscosity by the procedure described below. The compositions were cured by heating at 120° C. for 60 minutes, and the cured samples were measured for hardness and shear bond strength (initial and aged) by the procedures described below. The results are also shown in Table 1.

Viscosity

Both at the initial and after storage at 40° C. for 7 days, the silicone rubber adhesive composition was measured for viscosity by a rotational viscometer (BH rotor #7, 10 rpm).

Hardness

The cured sample of 3 cm×4 cm×6 mm (thick) was measured for hardness according to JIS K-6249 (Durometer type A). Separately, after storage at 40° C. for 7 days, the composition was similarly cured into a cured sample which was measured for hardness.

Shear Bond Strength

The composition was applied between overlapping glass plates of 25 mm×50 mm×5 mm (thick) to form an adhesive composition layer having a thickness of 2 mm and an overlap width of 10 mm. The adhesive composition layer was heat cured at 120° C. for 60 minutes, yielding a shear bond strength test assembly. The assembly was measured for shear bond strength according to JIS K-6249. The shear bond strength was similarly measured after aging of the assembly at 40° C. for 7 days.

TABLE 1

|  | Formulation | Example 1 | 2 | 3 | 4 | 5 | 6 | 7 | Comparative Example 1 | 2 |
|---|---|---|---|---|---|---|---|---|---|---|
| 1st step | | | | | | | | | | |
| (A) V-Sx (pbw) | | 100 | 100 | 100 | 100 | 100 | 100 | 100 | 100 | 100 |
| (B) Fumed silica (pbw) | | 10 | 10 | 10 | 10 | 10 | 10 | 10 | 10 | 10 |
| (C-1) Alkoxysilane (pbw) | | 1.5 | 1.5 | | 1.5 | 1.5 | 1.5 | 1.5 | | 1.5 |
| (C-2) Alkoxysilane (pbw) | | | | 1.5 | | | | | | |
| (D-1) Hydrolytic catalyst (pbw) | | 0.01 | 0.01 | 0.01 | | | | | 0.01 | |
| (D-2) Hydrolytic catalyst (pbw) | | | | | 0.01 | | | | | |
| (D-3) Hydrolytic catalyst (pbw) | | | | | | 0.01 | | | | |
| (D-4) Hydrolytic catalyst (pbw) | | | | | | | 0.01 | | | |
| (D-5) Hydrolytic catalyst (pbw) | | | | | | | | 0.01 | | |
| (E) H-Sx (pbw) | | 2.5 | | 2.5 | 2.5 | 2.5 | 2.5 | 2.5 | 2.5 | 2.5 |
| vacuum ($60 \pm 10^\circ$ C./1 kPa) mixing time (hr) | | 2 | 2 | 2 | 2 | 2 | 2 | 2 | — | 2 |
| 2nd step | | | | | | | | | | |
| (C-1) Alkoxysilane (pbw) | | | | | | | | | 1.5 | |
| (D-1) Hydrolytic catalyst (pbw) | | 0.3 | 0.3 | 0.3 | 0.3 | 0.3 | 0.3 | 0.3 | 0.31 | 0.3 |
| (E) H-Sx (pbw) | | | 2.5 | | | | | | | |
| (F) Regulator (pbw) | | 0.2 | 0.2 | 0.2 | 0.2 | 0.2 | 0.2 | 0.2 | 0.2 | 0.2 |
| (G) Pt catalyst | | 0.1 | 0.1 | 0.1 | 0.1 | 0.1 | 0.1 | 0.1 | 0.1 | 0.1 |
| vacuum ($30 \pm 10^\circ$ C./1 kPa) mixing time (hr) | | 0.5 | 0.5 | 0.5 | 0.5 | 0.5 | 0.5 | 0.5 | 2 | 0.5 |
| Test results | | | | | | | | | | |
| Viscosity (Pa-s) | Initial | 60 | 62 | 75 | 60 | 61 | 65 | 68 | 230 | 92 |
| | After storage 40° C./7 days | 62 | 81 | 80 | 62 | 65 | 71 | 72 | almost gelled | almost gelled |
| Hardness (Durometer A) | Immediately cured | 42 | 42 | 40 | 40 | 42 | 41 | 42 | 40 | 42 |
| | Cured after storage | 41 | 35 | 42 | 40 | 39 | 38 | 39 | (21) | (12) |
| Initial shear bond strength (MPa) | Glass | 1.5 | 1.6 | 1.6 | 1.8 | 1.5 | 1.6 | 1.6 | 1.5 | 1.6 |
| | PBT | 1.6 | 1.8 | 1.5 | 1.9 | 1.8 | 1.6 | 1.4 | 1.6 | 1.8 |
| Aged shear bond strength (MPa) | Glass | 1.3 | 1.5 | 1.6 | 1.9 | 1.3 | 1.5 | 1.5 | 0.5 | 0.6 |
| | PBT | 1.8 | 1.6 | 1.8 | 1.6 | 1.8 | 1.7 | 1.5 | 0.6 | 0.3 |

PBT: polybutylene terephthalate (A) V-Sx: Vinyl-Containing Organopolysiloxane

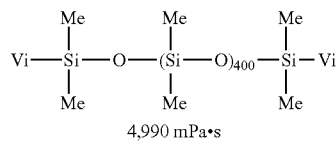

4,990 mPa·s (B) Fumed Silica specific surface area 310 m²/g,
surface treated with HN(Si(OMe)₂)

(C) Alkoxysilane

C-1: partial hydrolyzate of Si(OMe)₄
C-2: γ-glycidoxypropyltrimethoxysilane (D) Hydrolytic Catalyst D-1: Zr(ACAC)₄
D-2: Zr(O-iPr)₄
D-3: Zr(O-iPr)₃(OCOC₁₂H₂₅)
D-4: Ti(O-iPr)₄
D-5: Al(O-iPr)₃

(E) H-Sx: Hydrogenpolysiloxane

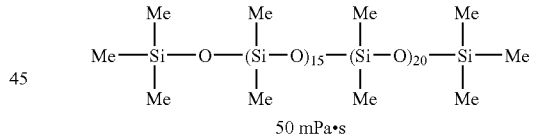

50 mPa·s (F) Cure Regulator
    50 wt % toluene solution of 1-ethynyl-cyclohexanol (G) Pt Catalyst
    the complex of platinum with 1,2-divinyl-1,1,2,2-tetramethyl-disiloxane in toluene (Pt=0.5 wt %)

The adhesive compositions of the invention have improved adhesion to less-receptive resins and shelf stability and undergo minimal changes of physical properties after curing, i.e., maintain stability in the cured state.

Japanese Patent Application No. 2006-348970 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A one-pack type addition cure silicone rubber adhesive composition comprising
   (A) 100 parts by weight of an organopolysiloxane containing at least two silicon-bonded alkenyl groups in a molecule, represented by the average compositional formula:

$R^1_a R^2_b SiO_{(4-a-b)/2}$ wherein $R^1$ is a substituted or unsubstituted, monovalent hydrocarbon group free of aliphatic saturation, $R^2$ is an alkenyl group, "a" is a positive number of 0.96 to 2.00, "b" is a positive number of 0.001 to 0.5, and the sum of a+b is 1.46 to 2.1,
   (B) 0.5 to 400 parts by weight of an inorganic filler,
   (C) 0.1 to 20 parts by weight of an alkoxysilane,
   (D) 0.001 to 10 parts by weight of a hydrolytic catalyst selected from the group consisting of titanium compounds, zirconium compounds and aluminum compounds,
   (E) an organohydrogenpolysiloxane represented by the average compositional formula:

$R^3_c H_d SiO_{(4-c-d)/2}$ wherein $R^3$ is a substituted or unsubstituted, monovalent hydrocarbon group free of aliphatic saturation, "c" is a positive number of 0.7 to 2.1, "d" is a positive number of 0.005 to 1.2, and the sum of c+d is 0.8 to 3.0, in such an amount as to provide a ratio of hydrosilyl groups to alkenyl groups available in the composition in the range from 0.4:1.0 to 10.0:1.0,
   (F) a necessary amount of a cure regulator, and
   (G) a platinum group metal compound in an amount to give a metal element content of 1 to 2000 ppm based on the total weight of the composition,
   said composition being prepared by mixing components (A) and (B) and part or all of components (C) and (D), in the absence of component (G), at a temperature of 0° C. to 200° C. and a reduced pressure to form a premix, and adding component (G) and the remaining components to the premix and mixing at a temperature of 0° C. to 60° C. and a reduced pressure.

2. A method for preparing a one-pack type addition cure silicone rubber adhesive composition comprising
   (A) 100 parts by weight of an organopolysiloxane containing at least two silicon-bonded alkenyl groups in a molecule, represented by the average compositional formula:

$R^1_a R^2_b SiO_{(4-a-b)/2}$ wherein $R^1$ is a substituted or unsubstituted, monovalent hydrocarbon group free of aliphatic saturation, $R^2$ is an alkenyl group, "a" is a positive number of 0.96 to 2.00, "b" is a positive number of 0.001 to 0.5, and the sum of a+b is 1.46 to 2.1,
   (B) 0.5 to 400 parts by weight of an inorganic filler,
   (C) 0.1 to 20 parts by weight of an alkoxysilane,
   (D) 0.001 to 10 parts by weight of a hydrolytic catalyst selected from the group consisting of titanium compounds, zirconium compounds and aluminum compounds,
   (E) an organohydrogenpolysiloxane represented by the average compositional formula:

$R^3_c H_d SiO_{(4-c-d)/2}$ wherein $R^3$ is a substituted or unsubstituted, monovalent hydrocarbon group free of aliphatic saturation, "c" is a positive number of 0.7 to 2.1, "d" is a positive number of 0.005 to 1.2, and the sum of c+d is 0.8 to 3.0, in such an amount as to provide a ratio of hydrosilyl groups to alkenyl groups available in the composition in the range from 0.4:1.0 to 10.0:1.0,
   (F) a necessary amount of a cure regulator, and
   (G) a platinum group metal compound in an amount to give a metal element content of 1 to 2000 ppm based on the total weight of the composition,
   said method comprising the first step of mixing components (A) and (B) and part or all of components (C) and (D), in the absence of component (G), in an environment at 0° C. to 200° C. and a reduced pressure to form a premix, and the second step of adding component (G) and the remaining components to the premix and mixing in an environment at 0° C. to 60° C. and a reduced pressure.

3. The method of claim 2 wherein component (C) and/or (D) is added in divided portions during the first and second steps.

4. The composition of claim 1 wherein said composition is prepared by mixing components (A) and (B) and part or all of components (C) and (D), in the absence of component (G), at a temperature of 0° C. to 200° C. and a reduced pressure of 0.1 to 20 kPa to form a premix, and adding component (G) and the remaining components to the premix and mixing at a temperature of 0° C. to 60° C. and a reduced pressure of 0.1 to 20 kPa.

5. The composition of claim 1 wherein said composition is prepared by mixing components (C) and (D), in the absence of component (G), at a temperature of 50° C. to 200° C. and a reduced pressure to form a premix, and adding component (G) and the remaining components to the premix and mixing at a temperature of 0° C. to 60° C. and a reduced pressure.

6. The composition of claim 1 which is used for adhesion to a thermoplastic resin selected from the group consisting of polyimide resins, polyphthalamides, polybutylene terephthalates, polyphenylene sulfides and syndiotactic polystyrenes.

7. The method of claim 2 wherein component (D) is added in divided portions during the first and second steps.

8. The method of claims 2 wherein the reduced pressure in the first step is 0.1 to 20 kPa.

9. The method of claim 2 wherein the reduced pressure in the second step is 0.1 to 20 kPa.

10. The method of claims 2 wherein the temperature in the first step is 50° C. to 200° C.

11. The method of claim 2 wherein the addition cure silicone rubber adhesive composition is used for adhesion to a thermoplastic resin selected from the group consisting of polyamide resins, polyphthalamides, polybutylene terephthalates, polyphenylene sulfides and syndiotactic polystyrenes.

* * * * *